(12) United States Patent
Atsumi et al.

(10) Patent No.: US 9,738,325 B2
(45) Date of Patent: Aug. 22, 2017

(54) VEHICLE FRONT SECTION STRUCTURE

(71) Applicant: Toyota Jidosha Kabushiki Kaisha, Toyota-shi (JP)

(72) Inventors: Hyuga Atsumi, Toyota (JP); Junichi Takayanagi, Nagoya (JP); Kenichiro Yoshimoto, Tokai (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/189,111

(22) Filed: Jun. 22, 2016

(65) Prior Publication Data

US 2017/0073018 A1 Mar. 16, 2017

(30) Foreign Application Priority Data

Sep. 10, 2015 (JP) .................................. 2015-178723

(51) Int. Cl.
*B62D 25/08* (2006.01)
*B62D 29/00* (2006.01)
*B62D 21/15* (2006.01)

(52) U.S. Cl.
CPC ............. *B62D 25/08* (2013.01); *B62D 21/15* (2013.01); *B62D 29/007* (2013.01)

(58) Field of Classification Search
CPC ....... B62D 25/08; B62D 29/007; B62D 21/15

USPC ........................................ 296/193.09, 203.02
See application file for complete search history.

(56) References Cited

U.S. PATENT DOCUMENTS 7,407,220 B2 *  8/2008  Kanagawa ........... B62D 25/088
                                               296/187.09
2002/0063444 A1 * 5/2002  Kim .................... B62D 25/081
                                               296/203.02

FOREIGN PATENT DOCUMENTS

JP    2008-143194    6/2008
JP    2009-255705   11/2009

* cited by examiner

*Primary Examiner* — Joseph D Pape
(74) *Attorney, Agent, or Firm* — Oblon, McClelland, Maier & Neustadt, L.L.P.

(57) ABSTRACT

The present invention provides a vehicle front section structure including: a side member front that is configured by a high tensile steel sheet, and has a closed cross-section; a side member rear that is configured by a high tensile steel sheet, and has a U-shaped cross-section open toward the upper side; a bracket that is disposed outside the closed cross-section of the side member front and inside the U-shaped cross-section of the side member rear, and has a first bottom wall that bends from a second bottom wall of the side member rear along a third bottom wall of the side member front; a first coupling portion that couples together the third bottom wall of the side member front and the first bottom wall of the bracket; and a second coupling portion that couples together the second bottom wall of the side member rear and the first bottom wall of the bracket.

7 Claims, 4 Drawing Sheets

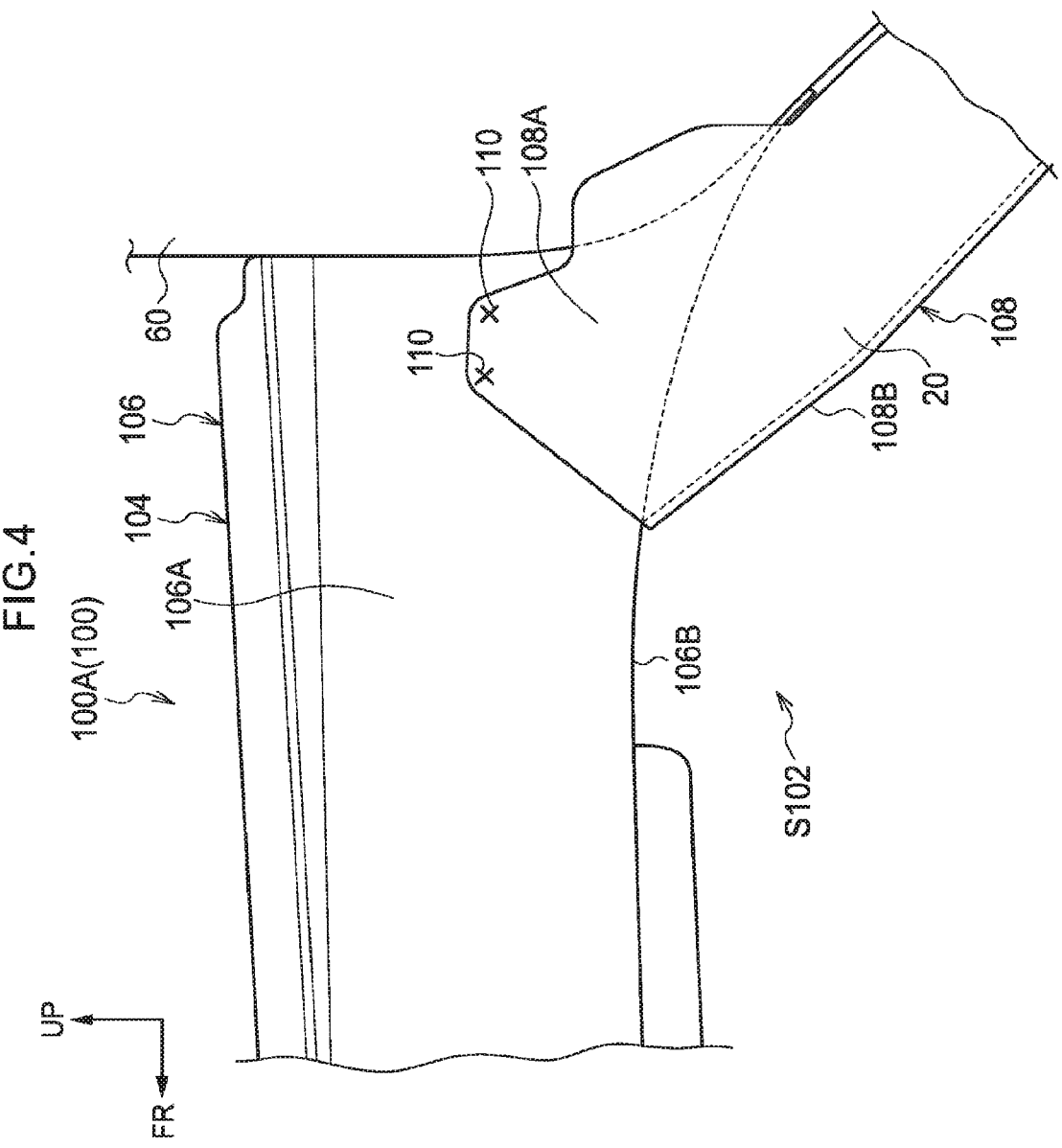

VEHICLE FRONT SECTION STRUCTURE

CROSS-REFERENCE TO RELATED APPLICATION

This application is based upon and claims the benefit of priority of the prior Japanese Patent Application No. 2015-178723, filed on Sep. 10, 2015, the entire contents of which are incorporated herein by reference.

FIELD

The embodiments discussed herein are related to a vehicle front section structure.

BACKGROUND

Patent Document 1 (Japanese Patent Application Laid-Open (JP-A) No. 2009-255705) describes a structure in which a front side member present extending along the vehicle front-rear direction is configured by a high tensile material (high tensile steel sheet), and a rear portion side of the front side member is joined to a front end portion of a floor frame at a curved portion (kick section) that curves toward the vehicle lower side. Note that Patent Document 2 (JP-A No. 2008-143194) also describes a vehicle front section structure, in which a suspension mount bracket is fixed to a lower face of a curved portion (kick section) of a front side member.

In the structure described in Patent Document 1 (JP-A No. 2009-255705), in cases in which the floor frame is also made of high tensile material, for example, it is difficult to form the high tensile material, and there are fewer degrees of freedom for the shape of a coupling portion between the front side member and the floor frame at the curved portion. There is accordingly a possibility that the strength of the coupling portion between the front side member and the floor frame is reduced.

In consideration of the above circumstances, an object of the present invention is to obtain a vehicle front section structure capable of improving the strength of a coupling portion between a side member front configured by high tensile steel sheet and a side member rear configured by high tensile steel sheet.

SUMMARY

A vehicle front section structure of a first aspect includes: a side member front that is positioned at a vehicle front-rear direction front side of a side member extending along the vehicle front-rear direction at a vehicle width direction outer side of a vehicle front section, the side member front being configured by a high tensile steel sheet and having a closed cross-section; a side member rear that is positioned at a vehicle front-rear direction rear side of the side member and that is present extending toward the vehicle rear side from a kick section extending toward a vehicle lower side, the side member rear being configured by a high tensile steel sheet and having a U-shaped cross-section open toward a vehicle up-down direction upper side; a bracket that is disposed outside the closed cross-section of the side member front and inside the U-shaped cross-section of the side member rear, the bracket having a first bottom wall at a vehicle up-down direction lower portion side of the bracket that bends from a second bottom wall at a vehicle up-down direction lower portion side of the side member rear along a third bottom wall at a vehicle up-down direction lower portion side of the side member front; a first coupling portion that, at the third bottom wall of the side member front, couples together the first bottom wall of the bracket, disposed at a lower face side of the third bottom wall, and the side member front; and a second coupling portion that, at the second bottom wall of the side member rear, couples together the first bottom wall of the bracket, disposed at an upper face side of the second bottom wall, and the side member rear.

In the vehicle front section structure of the first aspect, the side member front positioned at the vehicle front-rear direction front side of the side member is configured by high tensile steel sheet and has a closed cross-section. The side member rear positioned at the vehicle front-rear direction rear side of the side member is present extending toward the vehicle rear side from the kick section extending toward the vehicle lower side. The side member rear is configured by high tensile steel sheet and has a U-shaped cross-section open toward the vehicle up-down direction upper side. The bracket is disposed outside the closed cross-section of the side member front and inside the U-shaped cross-section of the side member rear. The first bottom wall at the lower portion side of the bracket bends from the second bottom wall at the lower portion side of the side member rear along the third bottom wall at the lower portion side of the side member front. The first bottom wall of the bracket disposed at the lower face side of the third bottom wall and the side member front are coupled together by the first coupling portion at the third bottom wall of the side member front. Namely, the third bottom wall of the side member front and the first bottom wall of the bracket disposed at the lower face side of the third bottom wall are coupled together by the first coupling portion. The first bottom wall of the bracket disposed at the upper face side of the second bottom wall and the side member rear are coupled together by the second coupling portion at the second bottom wall of the side member rear. Namely, the second bottom wall of the side member rear and the first bottom wall of the bracket disposed at the upper face side of the second bottom wall are coupled together by the second coupling portion. The third bottom wall of the side member front and the second bottom wall of the side member rear are thereby coupled together by the bracket. Thus, in the present aspect, the strength of the coupling portions between the side member front and the side member rear is improved compared to a configuration in which a third bottom wall of a side member front and a second bottom wall of a side member rear are not coupled together. The load transmission efficiency of the side member is thereby improved in a collision at the vehicle front section.

A vehicle front section structure of a second aspect is the vehicle front section structure of the first aspect, wherein: the bracket includes an outer side member disposed at the vehicle width direction outer side and an inner side member disposed further toward a vehicle width direction inner side than the outer side member; wherein the bracket is formed by the outer side member and the inner side member in a U shape open toward the vehicle up-down direction upper side; the side member front and the bracket are coupled together by a third coupling portion at respective side walls at both vehicle width direction sides of the side member front; and the side member rear and the bracket are coupled together by a fourth coupling portion at respective side walls at both vehicle width direction sides of the side member rear.

In the vehicle front section structure of the second aspect, the bracket is formed in a U shape open toward the vehicle up-down direction upper side by the outer side member disposed at the vehicle width direction outer side and the inner side member disposed further toward the vehicle width direction inner side than the outer side member. The side member front and the bracket are coupled together by the third coupling portion at the respective side walls at both vehicle width direction sides of the side member front. Namely, the respective side walls at both vehicle width direction sides of the side member front and the bracket are coupled together by the third coupling portion. The side member rear and the bracket are coupled together by the fourth coupling portion at the respective side walls at both vehicle width direction sides of the side member rear. Namely, the respective side walls at both vehicle width direction sides of the side member rear and the bracket are coupled together by the fourth coupling portion. The bracket is disposed outside the closed cross-section of the side member front and inside the U-shaped cross-section of the side member rear when this is performed.

In a configuration in which a bracket is further toward the outside than a U-shaped cross-section of a side member rear, for example, the U-shaped portion of the bracket deforms so as to open up due to load in a collision diagonally from the front side with respect to the vehicle front section, namely, in an oblique collision. Coupling portions at side walls of the bracket are thereby liable to come apart.

In contrast thereto, in the present aspect, the bracket is disposed inside the U-shaped cross-section of the side member rear, such that deformation in which the bracket attempts to open up is suppressed by the side member rear, and the fourth coupling portion between the respective side walls at both sides of the side member rear and the bracket are less liable to come apart.

In the present aspect, the inner side member and the outer side member are each assembled outside the side member front, and the side member rear is assembled outside the inner side member and the outer side member. Ease of assembly of the bracket to the side member front and the side member rear is thereby improved compared to a configuration in which a bracket is formed as a single member in a U shape open toward the vehicle up-down direction upper side.

A vehicle front section structure of a third aspect is the vehicle front section structure of the first aspect, wherein the first coupling portion and the second coupling portion are each configured by a dot-shaped coupling portion.

In the vehicle front section structure of the third aspect, the first coupling portion and the second coupling portion are each configured by a dot-shaped coupling portion. Coupling of the third bottom wall of the side member front and the bracket by the first coupling portion, and coupling of the second bottom wall of the side member rear and the bracket by the second coupling portion is therefore easy.

A vehicle front section structure of a fourth aspect is the vehicle front section structure of the second aspect, wherein the third coupling portion and the fourth coupling portion are each configured by a dot-shaped coupling portion.

In the vehicle front section structure of the fourth aspect, the third coupling portion and the fourth coupling portion are each configured by a dot-shaped coupling portion. Coupling of the side walls of the side member front and the bracket by the third coupling portion, and coupling of the side walls of the side member rear and the bracket by the fourth coupling portion is therefore easy.

A vehicle front section structure of a fifth aspect is the vehicle front section structure of the first aspect, wherein the bracket includes an outer side member disposed at the vehicle width direction outer side and an inner side member disposed further toward a vehicle width direction inner side than the outer side member; and the bracket is formed by the outer side member and the inner side member in a U shape open toward the vehicle up-down direction upper side.

A vehicle front section structure of a sixth aspect is the vehicle front section structure of the first aspect, wherein the side member front and the bracket are coupled together by a third coupling portion at respective side walls at both vehicle width direction sides of the side member front; and the side member rear and the bracket are coupled together by a fourth coupling portion at respective side walls at both vehicle width direction sides of the side member rear.

A vehicle front section structure of a seventh aspect is the vehicle front section structure of the first aspect, wherein the side member front includes a front outer member disposed at the vehicle width direction outer side and a front inner member disposed further toward the vehicle width direction inner side than the front outer member; and the side member rear is configured in a U shape by a single component.

In the vehicle front section structure of the seventh aspect, ease of assembly of the bracket to the side member front and the side member rear is improved.

The vehicle front section structure of the first aspect enables the strength of the coupling portions between the side member front configured by high tensile steel sheet and the side member rear configured by high tensile steel sheet to be improved.

BRIEF DESCRIPTION OF DRAWINGS

FIG. 4 is a side view illustrating a vehicle front section structure of a comparative example, in a state viewed from the vehicle width direction outer side.

DESCRIPTION OF EMBODIMENTS

Figure 1:
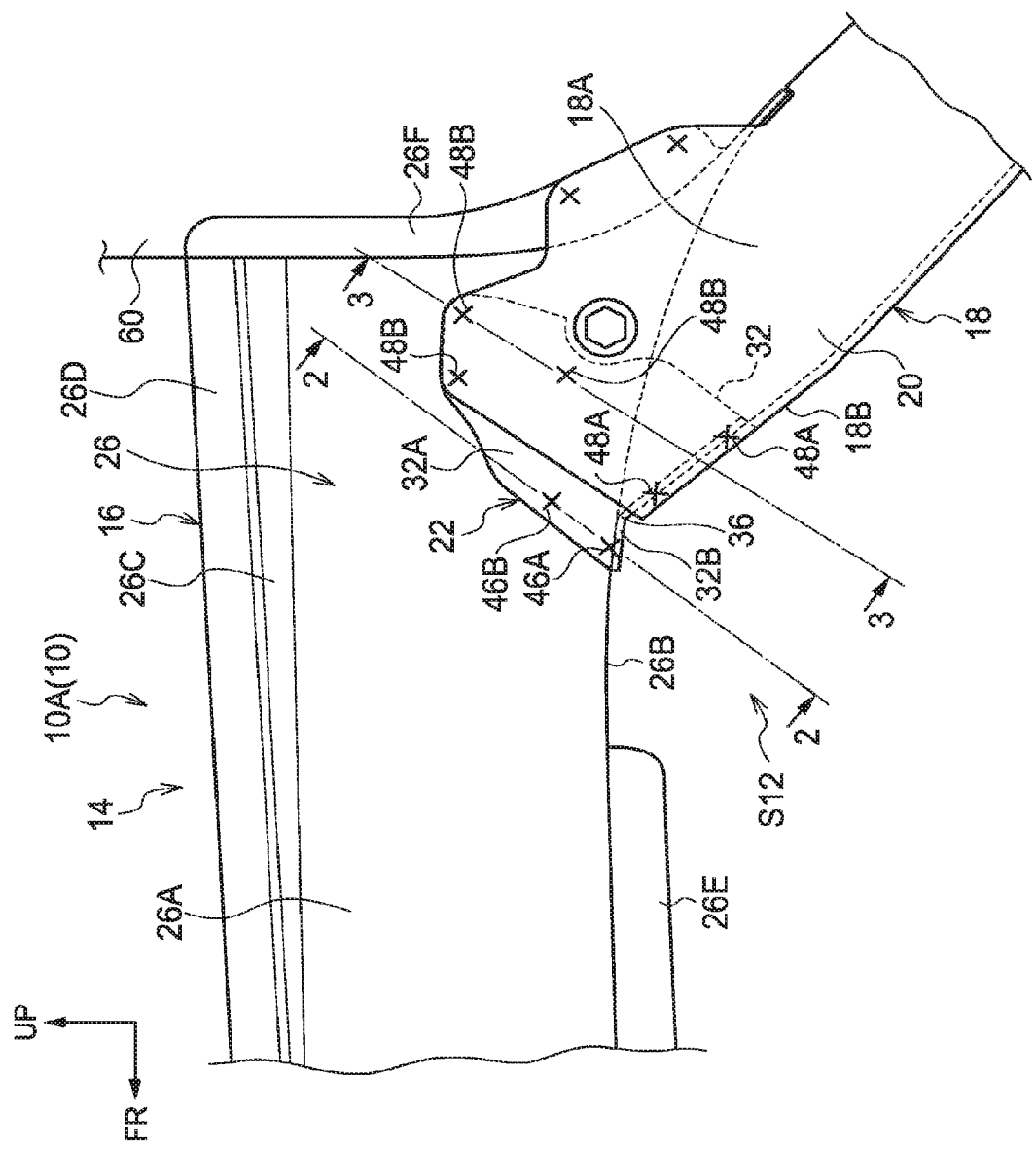
FIG. 1 is a side view illustrating a vehicle front section structure according to an exemplary embodiment, in a state viewed from the vehicle width direction outer side.
Figure 2:
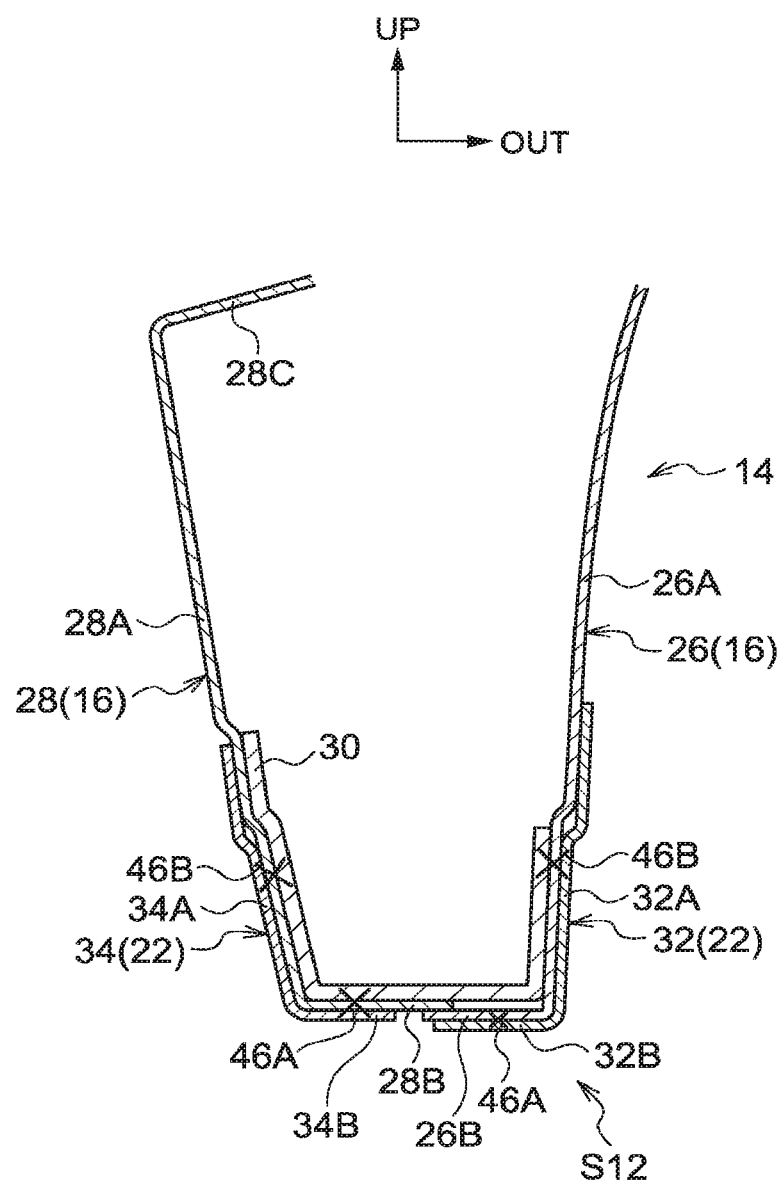
FIG. 2 is a cross-section (a cross-section along line 2-2 in FIG. 1) illustrating the vicinity of a coupling portion between a side-member-front and a bracket employed in the vehicle front section structure illustrated in FIG. 1.
Figure 3:
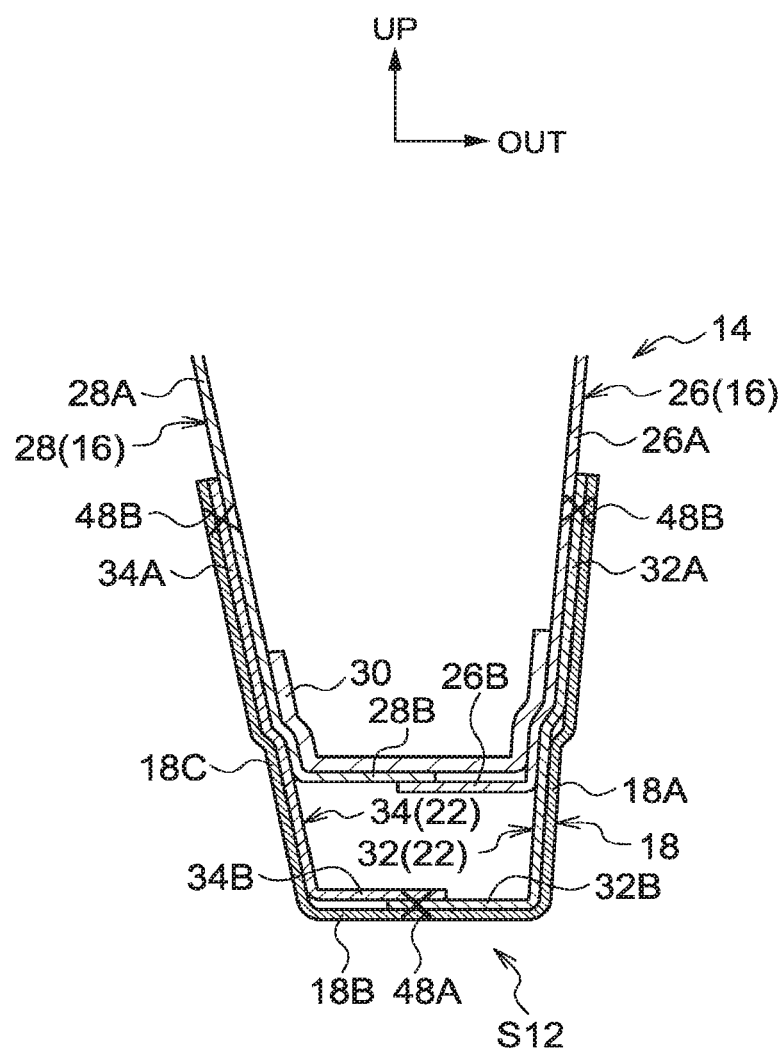
FIG. 3 is a cross-section (a cross-section along line 3-3 in FIG. 1) illustrating the vicinity of a coupling portion between a side member rear and a bracket employed in the vehicle front section structure illustrated in FIG. 1.

Explanation follows regarding an exemplary embodiment of a vehicle front section structure according to the present invention, with reference to FIGS. 1 to 3. Note that in each of the drawings as appropriate, the arrow FR indicates the vehicle front side, the arrow UP indicates the vehicle upper side, and the arrow OUT indicates the vehicle width direction outer side. In the below explanation, unless specifically stated otherwise, reference to the front-rear and up-down directions refers to front and rear in the vehicle front-rear direction and up and down in the vehicle up-down direction.

FIG. 1 is a side view illustrating a vehicle front section structure S12 according to the present exemplary embodiment, as viewed from the vehicle width direction outer side. As illustrated in FIG. 1, a front side member (FSM) 14, serving as a side member present extending along substantially the vehicle front-rear direction, is provided at the width direction outer side of a front section 10A of a vehicle 10, this being an automobile. The front side member 14 is a vehicle frame member disposed at the front section 10A of the vehicle 10. The front side member 14 includes a front side-member-front (hereafter referred to as "FSM front") 16 serving as a side-member-front positioned at the vehicle front-rear direction front side, and a front side member rear (hereafter referred to as "FSM rear") 18 serving as a side member rear positioned at the vehicle front-rear direction rear side.

The FSM front 16 is present extending along substantially the vehicle front-rear direction, and configures a front side section in the vehicle front-rear direction of the front side member 14. The FSM front 16, described later, has a closed cross-section sectioned along the vehicle width direction and vehicle up-down direction. The FSM front 16 is configured by high tensile steel sheet. High tensile steel sheet in the present exemplary embodiment (applied to an automobile) refers to steel sheet that has a higher tensile strength than normal steel sheet, such as steel sheet for an automobile with a tensile strength (nominal tensile strength, the same applies below) of 350 MPa or above. Note that steel sheet with a tensile strength of 590 MPa or above is sometimes referred to as ultra-high tensile steel sheet. The FSM front 16 is thinner and lighter in weight due to being configured by high tensile steel sheet.

The FSM rear 18 configures a rear side section in the vehicle front-rear direction of the front side member 14, and is present extending toward the vehicle rear side from a kick section 20 that extends diagonally toward the vehicle lower rear side at a rear portion side in the vehicle front-rear direction of the FSM front 16. Namely, the FSM rear 18 includes the kick section 20 of the front side member 14. The FSM front 16 does not include a kick section 20. The FSM rear 18, described later, has a substantially U-shaped cross-section sectioned along the vehicle width direction and vehicle up-down direction. Similarly to the FSM front 16, the FSM rear 18 is configured by high tensile steel sheet. The FSM rear 18 is thinner and lighter in weight due to being configured by high tensile steel sheet.

The vehicle front section structure S12 includes a bracket 22 disposed outside the closed cross-section of the FSM front 16 and inside the substantially U-shaped cross-section of the FSM rear 18. The bracket 22 is a member for coupling the FSM front 16 and the FSM rear 18 together, and is configured as a separate body to the FSM front 16 and the FSM rear 18. In other words, the bracket 22 is disposed between the FSM front 16 and the FSM rear 18, and the bracket 22 extends from a location between the FSM front 16 and the FSM rear 18 toward the vehicle front side and diagonally toward the vehicle lower rear side. Configuration of the bracket 22 is described later.

A dash panel 60 is provided running along substantially the vehicle up-down direction at the vehicle front-rear direction rear side of the FSM front 16. A rear end portion of the FSM front 16 (an attachment portion 26F of a FSM front outer 26, described later) and the dash panel 60 are joined together by welding or the like.

FIG. 2 is a cross-section (a cross-section along line 2-2 in FIG. 1) illustrating the vicinity of a coupling portion between the FSM front 16 and the bracket 22. As illustrated in FIG. 2, the FSM front 16 includes the FSM front outer 26 disposed at the vehicle width direction outer side, and a FSM front inner 28 disposed further toward the vehicle width direction inner side than the FSM front outer 26. The FSM front outer 26 is formed in a substantially U shape open toward the vehicle width direction inner side in cross-section as viewed along the vehicle width direction and vehicle up-down direction (the vehicle front side has a substantially hat shaped cross-section). Note that in FIG. 2, the location of an upper portion side of the FSM front outer 26 is omitted.

More specifically, the FSM front outer 26 includes a side wall portion 26A serving as a side wall disposed along substantially the vehicle up-down direction and substantially the vehicle front-rear direction, and a bottom wall portion 26B serving as a third bottom wall bending toward the vehicle width direction inside from a vehicle up-down direction lower end portion of the side wall portion 26A. As illustrated in FIG. 1, the FSM front outer 26 also includes an upper face portion 26C bending toward the vehicle width direction inside from a vehicle up-down direction upper end portion of the side wall portion 26A, and a flange portion 26D bending toward the vehicle upper side from a vehicle width direction inside end portion of the upper face portion 26C. Note that a flange portion 26E that bends toward the vehicle lower side from a vehicle width direction inside end portion of the bottom wall portion 26B is included at the front side in the vehicle front-rear direction of the FSM front outer 26.

The attachment portion 26F is provided at a rear end portion in the vehicle front-rear direction of the FSM front outer 26. The attachment portion 26F contacts a front face of the dash panel 60, and the attachment portion 26F and the dash panel 60 are joined together by welding or the like at plural locations.

As illustrated in FIG. 2, the FSM front inner 28 is formed in a substantially U shape open toward the vehicle width direction outer side in cross-section as viewed along the vehicle width direction and vehicle up-down direction (the vehicle front side has a substantially hat shaped cross-section). Note that the location of an upper portion side of the FSM front inner 28 is omitted in FIG. 2. The FSM front inner 28 includes a side wall portion 28A serving as a side wall disposed along substantially the vehicle up-down direction and substantially the vehicle front-rear direction, and a bottom wall portion 28B serving as a third bottom wall bending toward the vehicle width direction outside from a vehicle up-down direction lower end portion of the side wall portion 28A. The FSM front inner 28 also includes an upper face portion 28C bending toward the vehicle width direction outside at the upper side of the side wall portion 28A, and a flange portion (not illustrated in the drawings) bending toward the upper side from a vehicle width direction outside end portion of the upper face portion 28C. Although not illustrated in the drawings, the FSM front inner 28 also includes a flange portion at the lower side, in a position facing the flange portion 26E at the lower side of the FSM front outer 26 (see FIG. 1).

An upper face of a terminal portion of the bottom wall portion 26B of the FSM front outer 26 is overlapped with a lower face of a terminal portion of the bottom wall portion 28B of the FSM front inner 28. The bottom wall portion 28B and the bottom wall portion 26B are joined together by welding or the like at plural locations at the overlapping position. The flange portion 26D and the respective flange portion of the FSM front inner 28 are also joined together by welding or the like at plural locations in a state in which the flange portion (not illustrated in the drawings) at the upper side of the FSM front inner 28 has been overlapped with the flange portion 26D (see FIG. 1) at the upper side of the FSM front outer 26. A closed cross-section is thereby configured by the FSM front outer 26 and the FSM front inner 28. Note that plural locations are joined together by welding or the like at a portion where the flange portion 26E (see FIG. 1) at the lower side of the FSM front outer 26 is provided, in a state in which the flange portion 26E and the flange portion (not illustrated in the drawings) at the lower side of the FSM front inner 28 have been overlapped with each other.

As illustrated in FIG. 2, reinforcement 30 is disposed at a lower portion side of an inner portion of the FSM front 16. The reinforcement 30 is formed in substantially a U shape open toward the vehicle upper side. The reinforcement 30 is disposed so as to be contacted by at least part of the side wall portion 26A of the FSM front outer 26, and the side wall portion 28A and the bottom wall portion 28B of the FSM front inner 28. The reinforcement 30 is joined by welding or the like to plural locations of the FSM front outer 26 and the FSM front inner 28. Note that the reinforcement 30 is omitted in FIG. 1 in order to further facilitate understanding of the configuration of the vehicle front section structure S12.

As illustrated in FIG. 2, the bracket 22 includes an outer member 32 serving as an outer side member disposed at the vehicle width direction outer side, and an inner member 34 serving as an inner side member disposed further toward the vehicle width direction inner side than the outer member 32. In the present exemplary embodiment, the bracket 22 is configured by two components, these being the outer member 32 and the inner member 34. The outer member 32 includes a side wall portion 32A serving as a side wall disposed along substantially the vehicle up-down direction and substantially the vehicle front-rear direction, and a bottom wall portion 32B serving as a first bottom wall bending toward the vehicle width direction inside from a vehicle up-down direction lower end portion of the side wall portion 32A. The inner member 34 includes a side wall portion 34A serving as a side wall disposed along substantially the vehicle up-down direction and substantially the vehicle front-rear direction, and a bottom wall portion 34B serving as a first bottom wall bending toward the vehicle width direction outside from a vehicle up-down direction lower end portion of the side wall portion 34A.

As illustrated in FIG. 1, a bent portion 36, which bends (curves) from a bottom wall portion 18B, described later, at a vehicle up-down direction lower portion side of the FSM rear 18 along the bottom wall portion 26B of the FSM front outer 26 of the FSM front 16, is provided at the bottom wall portion 32B of the outer member 32 of the bracket 22. The bent portion (curved portion) 36 is configured so as to bend toward the vehicle lower side on progression from an intermediate portion in the vehicle front-rear direction of the bottom wall portion 32B toward the vehicle rear side. Although not illustrated in the drawings, a bent portion 36 that bends from the bottom wall portion 18B of the FSM rear 18 along the bottom wall portion 28B of the FSM front inner 28 (see FIG. 2) is also provided to the bottom wall portion 34B of the inner member 34 (see FIG. 2) of the bracket 22. In the present exemplary embodiment, in consideration of formability (ease of forming) when forming the bent portions 36, the outer member 32 and the inner member 34 of the bracket 22 are configured by high tensile steel sheet or normal steel sheet that has a lower tensile strength (that is softer) than the FSM rear 18, for example. Namely, the bent portions 36 can be easily formed, due to the outer member 32 and the inner member 34 of the bracket 22 being configured by high tensile steel sheet or normal steel sheet that has a lower tensile strength than the FSM rear 18.

As illustrated in FIG. 2, an inner face (a face at an inner portion side) of the outer member 32 is overlapped with an outer face (a face at an outer portion side) of the FSM front outer 26. More specifically, an inner face (a face at the vehicle width direction inside) of the side wall portion 32A of the outer member 32 is overlapped with an outer face (a face at the vehicle width direction outside) of the side wall portion 26A of the FSM front outer 26. An inner face (a face at the vehicle up-down direction upper side) of the bottom wall portion 32B of the outer member 32 is overlapped with an outer face (a face at the vehicle up-down direction lower side, namely, a lower face side of the bottom wall portion 26B) of the bottom wall portion 26B of the FSM front outer 26. The bottom wall portion 32B of the outer member 32 and the bottom wall portion 26B of the FSM front outer 26 are coupled (joined) together by a first coupling portion 46A, formed of a dot shaped coupling portion by spot welding or the like (see FIG. 1). The first coupling portion 46A may be provided at plural locations.

The reinforcement 30 is disposed so as to contact the inside (vehicle width direction inside) of the side wall portion 26A of the FSM front outer 26. The side wall portion 32A of the outer member 32, the side wall portion 26A of the FSM front outer 26, and the reinforcement 30 are coupled (joined) together by a third coupling portion 46B formed of a dot shaped coupling portion by spot welding or the like (see FIG. 1). The third coupling portion 46B may be provided at plural locations. Note that a bottom wall portion of the reinforcement 30 may be bent toward the vehicle lower side to match the position of the bottom wall portion 26B of the FSM front outer 26, and the bottom wall portion 32B of the outer member 32, the bottom wall portion 26B of the FSM front outer 26, and the reinforcement 30 may be coupled (joined) together by the first coupling portion 46A.

An inner face (a face at an inner portion side) of the inner member 34 is overlapped with an outer face (a face at an outer portion side) of the FSM front inner 28. More specifically, an inner face (a face at the vehicle width direction outside) of the side wall portion 34A of the inner member 34 is overlapped with an outer face (a face at the vehicle width direction inside) of the side wall portion 28A of the FSM front inner 28. An inner face (a face at the vehicle up-down direction upper side) of the bottom wall portion 34B of the inner member 34 is overlapped with an outer face (a face at the vehicle up-down direction lower side, namely, a lower face side of the bottom wall portion 28B) of the bottom wall portion 28B of the FSM front inner 28. In the present exemplary embodiment, the reinforcement 30 is overlapped at an inner portion side of the FSM front inner 28. The bottom wall portion 34B of the inner member 34, the bottom wall portion 28B of the FSM front inner 28, and the reinforcement 30 are coupled (joined) together by a first coupling portion 46A, formed of a dot shaped coupling portion by spot welding or the like. The side wall portion 34A of the inner member 34, the side wall portion 28A of the FSM front inner 28, and the reinforcement 30 are coupled (joined) together by a third coupling portion 46B formed of a dot shaped coupling portion by spot welding or the like. The third coupling portion 46B may be provided at plural locations. The bottom wall portion 32B of the outer member 32 and the bottom wall portion 34B of the inner member 34 are disposed with an interval in the vehicle width direction therebetween at the position of the cross-section illustrated in FIG. 2. The height in the vehicle up-down direction of the bottom wall portion 32B of the outer member 32 is positioned further toward the lower side than the height in the vehicle up-down direction of the bottom wall portion 34B of the inner member 34.

FIG. 3 is a cross-section (a cross-section along line 3-3 in FIG. 1) illustrating the vicinity of a coupling portion between the FSM rear 18 and the bracket 22. As illustrated in FIG. 3, the FSM rear 18 has a substantially U-shaped cross-section open toward the vehicle up-down direction upper side as viewed in cross-section along the vehicle width direction and vehicle up-down direction. In the present exemplary embodiment, the FSM rear 18 is configured by one component, this being a bent plate shaped member. More specifically, the FSM rear 18 includes a side wall portion 18A serving as a side wall disposed along substantially the vehicle up-down direction and substantially the vehicle front-rear direction at the vehicle width direction outside, and the bottom wall portion 18B serving as a second bottom wall bent toward the vehicle width direction inside from a vehicle up-down direction lower end portion of the side wall portion 18A. The FSM rear 18 also includes a side wall portion 18C serving as a side wall bent toward the vehicle upper side from a vehicle width direction inside end portion of the bottom wall portion 18B.

At the position of the cross-section illustrated in FIG. 3, the bottom wall portions 32B, 34B of the bracket 22 and the bottom wall portion 18B of the FSM rear 18 are disposed further toward the vehicle lower side than the bottom wall portions 26B, 28B of the FSM front 16, and are disposed at an interval to the bottom wall portions 26B, 28B. An inner face (a face at an inner portion side) of the FSM rear 18 is overlapped with an outer face (a face at an outer portion side) of the bracket 22. More specifically, an inner face (a face at the vehicle width direction inside) of the side wall portion 18A of the FSM rear 18 is overlapped with an outer face (a face at the vehicle width direction outside) of the side wall portion 32A of the outer member 32 of the bracket 22. An inner face (a face at the vehicle up-down direction upper side, namely, an upper face side of the bottom wall portion 18B) of the bottom wall portion 18B of the FSM rear 18 is overlapped with an outer face (a face at the vehicle up-down direction lower side) of the bottom wall portion 32B of the outer member 32. An inner face (a face at the vehicle width direction outside) of the side wall portion 18C of the FSM rear 18 is overlapped with an outer face (a face at the vehicle width direction inside) of the side wall portion 34A of the inner member 34 of the bracket 22.

A terminal portion of the bottom wall portion 34B of the inner member 34, a terminal portion of the bottom wall portion 32B of the outer member 32, and the bottom wall portion 18B of the FSM rear 18 are overlapped with each other at the lower portion of the FSM rear 18. The bottom wall portion 34B of the inner member 34, the bottom wall portion 32B of the outer member 32, and the bottom wall portion 18B of the FSM rear 18 are coupled (joined) together in this state by second coupling portions 48A of dot shaped coupling portions by spot welding or the like at plural locations (see FIG. 1). The bracket 22 is thereby formed in substantially a U shape open toward the vehicle up-down direction upper side by the inner member 34 and the outer member 32.

Note that in FIG. 3, although omitted from illustration in order to facilitate understanding of the configuration of the vehicle front section structure S12, when spot welding, for example, openings are provided in the bottom wall portions 26B, 28B of the FSM front 16 and the reinforcement 30 disposed on a line intersecting the bottom wall portion 32B of the outer member 32, and a welding tool for spot welding is inserted into these openings. This enables spot welding of the bottom wall portion 34B of the inner member 34, the bottom wall portion 32B of the outer member 32, and the bottom wall portion 18B of the FSM rear 18 to be performed by placing the welding tool in contact with the bottom wall portion 34B of the inner member 34, and placing another welding tool in contact with the bottom wall portion 18B of the FSM rear 18 from the opposite side.

The side wall portion 18A of the FSM rear 18, the side wall portion 32A of the outer member 32, and the side wall portion 26A of the FSM front outer 26 are overlapped with each other at the vehicle width direction outside of an upper portion of the FSM rear 18. The side wall portion 18A of the FSM rear 18, the side wall portion 32A of the outer member 32, and the side wall portion 26A of the FSM front outer 26 are coupled (joined) together in this state by fourth coupling portions 48B of dot shaped coupling portions by spot welding or the like at plural locations (see FIG. 1). The side wall portion 18C of the FSM rear 18, the side wall portion 34A of the inner member 34, and the side wall portion 28A of the FSM front inner 28 are overlapped with each other at the vehicle width direction inside of the upper portion of the FSM rear 18. The side wall portion 18C of the FSM rear 18, the side wall portion 34A of the inner member 34, and the side wall portion 28A of the FSM front inner 28 are coupled (joined) together in this state by a fourth coupling portion 48B of a dot shaped coupling portion by spot welding or the like. Note that the fourth coupling portion 48B may also be provided at plural locations.

Note that in FIG. 3, although omitted from illustration, for example, an opening may be provided to the FSM rear 18 at the position at which the FSM rear 18, the bracket 22, the FSM front 16, and the reinforcement 30 overlap each other, and a welding tool may be placed in contact thereto through the opening. This enables the bracket 22, the FSM front 16, and the reinforcement 30 to be joined together by spot welding.

Explanation follows regarding operation and advantageous effects of the present exemplary embodiment.

As illustrated in FIG. 1 and so on, the FSM front 16 (the FSM front outer 26 and the FSM front inner 28) positioned at the vehicle front-rear direction front side of the front side member 14 is configured by high tensile steel sheet and has a closed cross-section. The FSM rear 18 positioned at the vehicle front-rear direction rear side of the front side member 14 is present extending from the kick section 20 toward the vehicle rear side. The FSM rear 18 is configured by high tensile steel sheet and has a substantially U-shaped cross-section open toward the vehicle upper side. The bracket 22 is disposed outside the closed cross-section of the FSM front 16 and inside the U-shaped cross-section of the FSM rear 18. The bracket 22 includes the outer member 32 and the inner member 34. The bottom wall portion 32B of the outer member 32 and the bottom wall portion 34B of the inner member 34 include the bent portion 36, which is bent from the bottom wall portion 18B of the FSM rear 18 along the bottom wall portions 26B, 28B of the FSM front 16.

In the vehicle front section structure S12, the bracket 22 disposed at a lower face side of the bottom wall portions 26B, 28B and the FSM front 16 are coupled together by the first coupling portions 46A at the bottom wall portions 26B, 28B of the FSM front 16 (the FSM front outer 26 and the FSM front inner 28) (see FIG. 2). Namely, the bottom wall portions 26B, 28B of the FSM front 16 (the FSM front outer 26 and the FSM front inner 28) and the bracket 22 disposed at the lower face side of the bottom wall portions 26B, 28B are coupled together by the first coupling portions 46A. The FSM front 16 and the bracket 22 are coupled together by the third coupling portions 46B at the side wall portions 26A, 28A of the FSM front 16 (the FSM front outer 26 and the FSM front inner 28) (see FIG. 2). Namely, the side wall portions 26A, 28A of the FSM front 16 (the FSM front outer 26 and the FSM front inner 28) and the bracket 22 are coupled together by the third coupling portions 46B.

The bracket 22 disposed at an upper face side of the bottom wall portion 18B and the FSM rear 18 are coupled together by the second coupling portions 48A at the bottom wall portion 18B of the FSM rear 18 (see FIG. 3). Namely, the bottom wall portion 18B of the FSM rear 18 and the bracket 22 disposed at the upper face side of the bottom wall portion 18B are coupled together by the second coupling portions 48A. The FSM rear 18 and the bracket 22 are coupled together by the fourth coupling portions 48B at the side wall portions 18A, 18C of the FSM rear 18 (see FIG. 3). Namely, the side wall portions 18A, 18C of the FSM rear 18 and the bracket 22 are coupled together by the fourth coupling portions 48B.

In the vehicle front section structure S12, the bracket 22 is disposed outside the closed cross-section of the FSM front 16 and inside the substantially U-shaped cross-section of the FSM rear 18. The bottom wall portions 26B, 28B of the FSM front 16 and the bottom wall portion 18B of the FSM rear 18 are coupled together by the bracket 22. Thus, in the vehicle front section structure S12, the strength of the coupling portions between the FSM front 16 and the FSM rear 18 is improved compared to, for example, a configuration in which a bottom wall portion of a side-member-front and a bottom wall portion of a side member rear are not coupled together. This enables the load transmission efficiency of the front side member 14 to be improved in a collision at the front section 10A of the vehicle 10. In cases of a collision diagonally from the front side with respect to the front section 10A of the vehicle 10 (this collision mode is referred to as an "oblique collision" below), for example, the front side member 14 can be made to undergo folding deformation toward the vehicle width direction inside at an intended position, and lateral force can be generated in the vehicle 10.

In the vehicle front section structure S12, the bracket 22 is disposed outside the closed cross-section of the FSM front 16 and inside the substantially U-shaped cross-section of the FSM rear 18. Namely, the bracket 22 is disposed between the FSM front 16 and the FSM rear 18. The FSM front 16 and the bracket 22 are coupled together by the third coupling portions 46B at the side wall portions 26A, 28A of the FSM front 16. The FSM rear 18 and the bracket 22 are coupled together by the fourth coupling portions 48B at the side wall portions 18A, 18C of the FSM rear 18. In this configuration, the side wall portions 32A, 34A of the bracket 22 are disposed inside the substantially U-shaped cross-section of the FSM rear 18, such that the fourth coupling portions 48B are less liable to come apart at the side wall portions 32A, 34A of the bracket 22 in an oblique collision of the front section 10A of the vehicle 10. In a configuration in which a bracket is disposed outside a substantially U-shaped cross-section of an FSM rear, for example, the U-shaped cross-section of the bracket outside the FSM rear would deform so as to open up due to load in an oblique collision, and so fourth coupling portions would be liable to come apart at side wall portions of the bracket. In contrast thereto, in the vehicle front section structure S12 of the present exemplary embodiment, the bracket 22 is disposed inside the substantially U-shaped cross-section of the FSM rear 18, such that deformation in which the bracket 22 attempts to open up can be suppressed by the substantially U-shaped cross-section of the FSM rear 18. The fourth coupling portions 48B are thereby less liable to come apart at the side wall portions 32A, 34A of the bracket 22.

The bracket 22 includes the outer member 32 disposed at the vehicle width direction outer side and the inner member 34 disposed further toward the vehicle width direction inner side than the outer member 32, and is formed by the outer member 32 and the inner member 34 in a U shape open toward the vehicle up-down direction upper side. This enables the outer member 32 and the inner member 34 to be respectively assembled to the FSM front 16, and the FSM rear 18 to be assembled at the outside of the outer member 32 and the inner member 34. Thus, in the vehicle front section structure S12, ease of assembly of the FSM front 16 and the FSM rear 18 to the bracket 22 can be improved compared to a configuration in which a bracket is a single member formed in a U shape open toward the vehicle up-down direction upper side.

In the vehicle front section structure S12, the bottom wall portion 26B of the FSM front outer 26 is coupled to the bottom wall portion 32B of the outer member 32 of the bracket 22 by the first coupling portion 46A (see FIG. 2). The bottom wall portion 28B of the FSM front inner 28 is coupled to the bottom wall portion 34B of the inner member 34 of the bracket 22 by the first coupling portion 46A (see FIG. 2). The bottom wall portion 18B of the FSM rear 18 is coupled to the bottom wall portion 32B and the bottom wall portion 34B of the bracket 22 by the second coupling portions 48A (see FIG. 3). The rigidity of the front side member 14 is thereby increased, and water stoppage (rust prevention) at the coupling portions of the respective bottom wall portions of the FSM front 16 and the FSM rear 18 is improved.

In the vehicle front section structure S12, the FSM front 16 and the bracket 22 are coupled together by the first coupling portions 46A of dot shaped coupling portions by spot welding or the like at the bottom wall portions 26B, 28B of the FSM front 16 (the FSM front outer 26 and the FSM front inner 28) (see FIG. 2). The FSM front 16 and the bracket 22 are also coupled together by the third coupling portions 46B of dot shaped coupling portions by spot welding or the like at the side wall portions 26A, 28A of the FSM front 16 (the FSM front outer 26 and the FSM front inner 28) (see FIG. 2). The FSM rear 18 and the bracket 22 are coupled together by the second coupling portions 48A of dot shaped coupling portions by spot welding or the like at the bottom wall portion 18B of the FSM rear 18 (see FIG. 3). The FSM rear 18 and the bracket 22 are also coupled together by the fourth coupling portions 48B of dot shaped coupling portions by spot welding or the like at the side wall portions 18A, 18C of the FSM rear 18 (see FIG. 3). This facilitates coupling of the FSM front 16 and the bracket 22 by the first coupling portions 46A and the third coupling portions 46B at the bottom wall portions 26B, 28B and the side wall portions 26A, 28A of the FSM front 16. This also facilitates coupling of the FSM rear 18 and the bracket 22 by the second coupling portions 48A and the fourth coupling portions 48B at the bottom wall portion 18B and the side wall portions 18A, 18C of the FSM rear 18.

FIG. 4 illustrates a vehicle front section structure S102 of a comparative example. As illustrated in FIG. 4, a front side member 104 is provided so as to be present extending along the vehicle front-rear direction at a front section 100A of a vehicle 100. The front side member 104 includes a FSM front 106 positioned at the vehicle front-rear direction front side, and a FSM rear 108 positioned at the vehicle front-rear direction rear side and present extending from a kick section 20 toward the vehicle rear side. The FSM front 106 and the FSM rear 108 are configured by high tensile steel sheet. In the vehicle front section structure S102, there is no bracket provided as a separate body in order to couple the FSM front 106 and the FSM rear 108 together.

A rear portion of the FSM front 106 is formed in a substantially rectangular shape in cross-section as viewed along the vehicle width direction and vehicle up-down direction. The FSM rear 108 is formed in substantially a U shape open toward the vehicle up-down direction upper side in cross-section as viewed along the vehicle width direction and vehicle up-down direction. An inner face (a face at an inner portion side) of a side wall portion 108A of the FSM rear 108 is disposed so as to contact an outer face (a face at an outer portion side) of a side wall portion 106A of the FSM front 106. The side wall portion 106A of the FSM front 106 and the side wall portion 108A of the FSM rear 108 are coupled (joined) together by coupling portions 110 of dot shaped coupling portions by spot welding or the like at plural locations. The actual number of coupling portions 110 is greater than that illustrated in FIG. 4.

Since the FSM rear 108 is configured by high tensile steel sheet, it is difficult to form the vehicle front-rear direction front side of a bottom wall portion 108B of the FSM rear 108 in a shape bent so as to follow a bottom wall portion 106B of the FSM front 106 (a shape curving in toward the bottom wall portion 106B side). Thus, a front end portion of the bottom wall portion 108B of the FSM rear 108 cannot be disposed in a face-to-face contact state with the bottom wall portion 106B of the FSM front 106, and the bottom wall portion 108B of the FSM rear 108 and the bottom wall portion 106B of the FSM front 106 cannot be joined together by spot welding or the like. The side wall portion 106A of the FSM front 106 and the side wall portion 108A of the FSM rear 108 are thereby coupled together at the coupling portions 110.

In the vehicle front section structure S102, it is difficult to control the FSM front 106 so as to undergo folding deformation toward the vehicle width direction inside as intended in an oblique collision of the front section 100A of the vehicle 100. It is conceivable that this is because the bottom wall portion 108B of the FSM rear 108 and the bottom wall portion 106B of the FSM front 106 are not coupled together, and so the bottom wall portion 108B of the FSM rear 108 and the bottom wall portion 106B of the FSM front 106 are offset relative to each other.

In contrast thereto, in the vehicle front section structure S12 of the present exemplary embodiment, the bracket 22 is disposed outside the FSM front 16 and inside the FSM rear 18, and the bottom wall portions 26B, 28B of the FSM front 16 and the bottom wall portion 18B of the FSM rear 18 are coupled together by the bracket 22. The strength of the coupling portions between the FSM front 16 and the FSM rear 18 is thereby improved, and the load transmission efficiency of the front side member 14 in a collision at the front section 10A of the vehicle 10 is improved. Thus, the vehicle front section structure S12 enables the front side member 14 to be made to undergo folding deformation toward the vehicle width direction inside at an intended position in an oblique collision, in contrast to the vehicle front section structure S102.

Note that the number and position of the first coupling portions 46A, the second coupling portions 48A, the third coupling portions 46B, and the fourth coupling portions 48B in the above exemplary embodiment may be changed within a range not departing from the present invention.

In the present exemplary embodiment, the bracket 22 is configured by two components, these being the outer member 32 and the inner member 34; however, the present invention is not limited to this configuration. A bracket may be configured by plural components, including an outer member and an inner member. A bracket may also be configured by a single component.

In the above exemplary embodiment, the bent portion 36 is provided bending from the bottom wall portion (second bottom wall) of the FSM rear 18 along the bottom wall portion (third bottom wall) of the FSM front 16 at the bottom wall portion (first bottom wall) of the bracket 22; however, the present invention is not limited to this configuration. For example, a curved portion may be provided bending so as to curve from the bottom wall portion (second bottom wall) of the FSM rear 18 along the bottom wall portion (third bottom wall) of the FSM front 16 at the bottom wall portion (first bottom wall) of the bracket 22.

The shapes of the FSM front outer 26 and the FSM front inner 28 configuring the FSM front 16 are not limited to the shapes in the above exemplary embodiment, and may be changed.

The shape of the FSM rear 18 is not limited to the shape in the above exemplary embodiment, and may be changed. In the above exemplary embodiment, the shape of the FSM rear 18 is a substantially U-shaped cross-section open toward the vehicle up-down direction upper side; however, the shape of the FSM rear 18 may be a hat-shaped cross-section open toward the vehicle up-down direction upper side. The FSM rear 18 may be configured by plural components.

The disclosure of Japanese Patent Application No. 2015-178723, filed on Sep. 10, 2015, is incorporated in its entirety by reference herein.

All cited documents, patent applications and technical standards mentioned in the present specification are incorporated by reference in the present specification to the same extent as if the individual cited document, patent application, or technical standard was specifically and individually indicated to be incorporated by reference.

What is claimed is:

1. A vehicle front section structure comprising:
 a side member front that is positioned at a vehicle front-rear direction front side of a side member extending along the vehicle front-rear direction at a vehicle width direction outer side of a vehicle front section, the side member front being configured by a high tensile steel sheet and having a closed cross-section;
 a side member rear that is positioned at a vehicle front-rear direction rear side of the side member and that is present extending toward the vehicle rear side from a kick section extending toward a vehicle lower side, the side member rear being configured by a high tensile steel sheet and having a U-shaped cross-section open toward a vehicle up-down direction upper side;
 a bracket that is disposed outside the closed cross-section of the side member front and inside the U-shaped cross-section of the side member rear, the bracket having a first bottom wall at a vehicle up-down direction lower portion side of the bracket that bends from a second bottom wall at a vehicle up-down direction lower portion side of the side member rear along a third bottom wall at a vehicle up-down direction lower portion side of the side member front;
 a first coupling portion that, at the third bottom wall of the side member front, couples together the first bottom wall of the bracket, is disposed at a lower face side of the third bottom wall, and the side member front; and
 a second coupling portion that, at the second bottom wall of the side member rear, couples together the first bottom wall of the bracket, is disposed at an upper face side of the second bottom wall, and the side member rear.

2. The vehicle front section structure of claim 1, wherein: the bracket includes an outer side member disposed at the vehicle width direction outer side and an inner side member disposed further toward a vehicle width direction inner side than the outer side member;
the bracket is formed by the outer side member and the inner side member in a U shape open toward the vehicle up-down direction upper side;
the side member front and the bracket are coupled together by a third coupling portion at respective side walls at both vehicle width direction sides of the side member front; and
the side member rear and the bracket are coupled together by a fourth coupling portion at respective side walls at both vehicle width direction sides of the side member rear.

3. The vehicle front section structure of claim 1, wherein the first coupling portion and the second coupling portion are each configured by a dot-shaped coupling portion.

4. The vehicle front section structure of claim 2, wherein the third coupling portion and the fourth coupling portion are each configured by a dot-shaped coupling portion.

5. The vehicle front section structure of claim 1, wherein:
the bracket includes an outer side member disposed at the vehicle width direction outer side and an inner side member disposed further toward a vehicle width direction inner side than the outer side member; and
the bracket is formed by the outer side member and the inner side member in a U shape open toward the vehicle up-down direction upper side.

6. The vehicle front section structure of claim 1, wherein:
the side member front and the bracket are coupled together by a third coupling portion at respective side walls at both vehicle width direction sides of the side member front; and
the side member rear and the bracket are coupled together by a fourth coupling portion at respective side walls at both vehicle width direction sides of the side member rear.

7. The vehicle front section structure of claim 1, wherein:
the side member front includes a front outer member disposed at the vehicle width direction outer side and a front inner member disposed further toward the vehicle width direction inner side than the front outer member; and
the side member rear is configured in a U shape by a single component.

* * * * *